United States Patent [19]

Bitter et al.

[11] Patent Number: 4,810,366

[45] Date of Patent: Mar. 7, 1989

[54] PROCESS FOR SEPARATING A FLUID FEED MIXTURE CONTAINING HYDROCARBON OIL AND AN ORGANIC SOLVENT

[75] Inventors: Johan G. A. Bitter; Johannes P. Haan, both of Amsterdam, Netherlands

[73] Assignee: Shell Oil Company, Houston, Tex.

[21] Appl. No.: 74,174

[22] Filed: Jul. 16, 1987

[30] Foreign Application Priority Data

Aug. 7, 1986 [GB] United Kingdom ............... 86199278

[51] Int. Cl.$^4$ ....................... C10G 21/28; C07C 7/144
[52] U.S. Cl. .................................... 208/308; 208/321
[58] Field of Search ........................ 208/308, 309, 321; 585/818, 819; 210/500.21, 500.26, 500.33

[56] References Cited

U.S. PATENT DOCUMENTS

| | | | |
|---|---|---|---|
| 2,930,754 | 3/1960 | Stuckey | 210/23 |
| 2,947,687 | 8/1960 | Lee | 208/308 |
| 2,985,588 | 5/1961 | Binning et al. | 208/308 |
| 3,440,264 | 4/1966 | McVannel | 208/308 |
| 3,556,991 | 1/1971 | Gerhold | 208/321 |
| 4,411,790 | 10/1983 | Arod et al. | 210/637 |
| 4,532,029 | 7/1985 | Black et al. | 208/308 |
| 4,670,151 | 6/1987 | Bitter | 210/641 |

*Primary Examiner*—Glenn Caldarola
*Attorney, Agent, or Firm*—Ronald R. Reper

[57] ABSTRACT

Process for separating a fluid feed mixture containing hydrocarbon oil and an organic solvent (e.g. obtained from a furfural extraction unit) by contacting said fluid feed mixture at elevated pressure with one side of a hydrocarbon oil-selective membrane containing a layer of a silicone polymer which is substantially impermeable to said organic solvent and recovering hydrocarbon oil permeate from the other side of the membrane.

7 Claims, No Drawings

PROCESS FOR SEPARATING A FLUID FEED MIXTURE CONTAINING HYDROCARBON OIL AND AN ORGANIC SOLVENT

BACKGROUND OF THE INVENTION

The invention relates to a process for separating a fluid feed mixture containing hydrocarbon oil and an organic solvent.

It is known to separate various hydrocarbon compounds from feed mixtures containing said compounds and a solvent by contacting the feed mixture at elevated pressure with one (feed) side of a membrane and recovering solvent and optionally one or more hydrocarbon compounds from the other (permeate) side of the membrane.

However, a major disadvantage of said known separation processes is that a sharp separation into a solvent fraction and a single hydrocarbon oil fraction is not attained therewith; hydrocarbons remain present at both sides of the membranes. Moreover, in case a feed mixture with a relatively high solvent:oil ratio has to be separated, it would be necessary to employ relatively large membrane areas to obtain a given quantity of solvent-poor hydrocarbon oil at the feed side of the membrane.

Surprisingly, it has now been found that the aforementioned disadvantages can be overcome by contacting said fluid feed mixture with one side of a hydrocarbon oil-selective membrane which is substantially impermeable to the organic solvent(s) present in the feed mixture and recovering hydrocarbon oil permeate from the other side of the membrane.

SUMMARY OF THE INVENTION

Accordingly, the present invention provides a process for separating a fluid feed mixture containing hydrocarbon oil and an organic solvent which comprises contacting said fluid feed mixture at elevated pressure with one side of a hydrocarbon oil-selective membrane which is substantially impermeable to said organic solvent and recovering hydrocarbon oil permeate from the other side of the membrane.

In a preferred embodiment the process comprises subjecting said fluid feed mixture to reverse osmosis in a reverse osmosis zone with a membrane comprising a silicone polymer to afford: (1) a retentate stream having an organic solvent content higher than said feed, and (2) a permeate stream having an organic solvent content less than the amount of solvent in said feed mixture.

DESCRIPTION OF PREFERRED EMBODIMENTS

The process according to the invention is preferably carried out as a reverse osmosis—or a dialysis—process; however, it can also be carried out e.g. as a pervaporation process (wherein at least part of the permeate is removed by means of evaporation from the "other" side of the membrane).

In a reverse osmosis process, in which a difference in hydraulic pressure between both sides of the membrane is maintained as the driving force, various types of membrane units may be applied such as a flat sheet or a tubular membrane unit. Flat membranes are less attractive in case the osmotic pressure is relatively high because said membranes would need to be relatively thick or be supported by a support material having relatively small pores in order to have sufficient strength to withstand the applied pressure differences, and consequently the permeate flux through flat membranes would be relatively low in this case. Moreover, such configurations require a relatively large amount of volume because their packing density (m² membrane/m³ apparatus) is low. Preference is given to the application of spirally wound- or hollow fibre-membranes which have a high packing density and can withstand a relatively high pressure difference between both sides of the membrane for a given wall thickness.

The pressure difference applied between the one side of the membrane contacted with the fluid feed mixture (the feed-side) and the other (permeate) side is preferably from 2–200 bar, and most preferably from 10–80 bar.

The temperature at which the present process is carried out may vary within a wide range and is not critical as long as the applied membranes can withstand the operating conditions. A fluid feed temperature from $-40°$ C. to $+400°$ C. is suitable in most cases, whereas a temperature from $-20°$ C. to $+300°$ C., particularly 20° C. to 80° C., is preferred.

It has been found that membranes containing-layer of a specific silicon polymer as described hereinafter are particularly suitable as oil selective membranes for application in the process according to the invention. Said silicone polymer comprises a plurality of units according to the general formula:

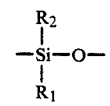

wherein $R_1$ and $R_2$ represent moieties independently chosen from the group consisting of hydrogen, and carbon-containing moieties selected from alkyl, aryl and aralkyl moieties having 1–10 carbon atoms per moiety. Preferably, $R_1$ and $R_2$ represent the same or different alkyl moieties. A particularly preferred silicone polymer for use as membrane (layer) in the process according to the invention is poly dimethyl siloxane which is highly oil-selective and through which only a relatively small fraction of organic solvent permeates.

The membrane suitably comprises the silicone compound as described hereinbefore in the form of a crosslinked polymer; however, a copolymer of said silicone compound and an elastomeric prepolymer may be used instead.

Various elastomers such as (synthetic) rubbers, polystyrene, polybutadiene or copolymers of styrene and butadiene can also be applied as selective membrane layers per se in the process according to the invention.

The selective membrane layer applied in the present process is preferably substantially non-porous (dense) in order to avoid permeation of substantial amounts of organic solvent through said layer. The membrane layer which is substantially impermeable to said organic solvent preferably has a thickness of from 0.1–100 μm, and most preferably from 1–10 μm, in order to attain relatively high hydrocarbon oil permeate fluxes therethrough.

The use of reinforcing filler in the hydrocarbon oil-selective membrane layer is preferably avoided because of a possible negative influence thereof on the permeability of said membrane layer. A membrane with excellent strength for the present purpose can be obtained by supporting the silicone layer by means of a porous support which may contain a layer of any suitable material, such as cloth, wire net or glass fibers. A porous polypropylene support layer is preferred in case a silicone polymer is applied as nonporous membrane layer in view of the adhesive bond which can be attained between these two layers; such a support layer suitably has a thickness from 10–500 μm. In some cases it may be advantageous to apply at least one extra layer between a dense, hydrocarbon-oil selective layer and a porous support; this intermediate layer is suitably a dense highly permeable layer with a good bonding capacity for both the selective layer and the support.

Dense membrane layers comprising a silicone compound suitable for use in the separation process according to the invention may be prepared by any method known in the art. A suitable method is solvent casting which involves forming a solution of a polymer or a prepolymer of the desired membrane compound in a solvent (to which a surface active agent is usually added) and casting the solution onto a liquid support to produce a thin layer which is subsequently dried (by evaporation of the solvent present in the (pre)polymer solution). The applied solvent is generally substantially immiscible in the liquid support in order to avoid a reduction of the surface tension of the liquid support which could lead to instability of the developing membrane and possible generation of holes therein.

Water is a preferred supporting liquid, in particular when used in combination with a prepolymer which can be cross-linked in the presence of water. Most preferably a prepolymer solution of dimethyl siloxane in 3-heptanone is allowed to spread out over a water surface and form a cross-linked, dense membrane layer.

The process according to the present invention is well suited for applications in which a feed solution comprising petroleum derived hydrocarbon oil dissolved in an organic solvent is available as such. This is the case when hydrocarbon oils have been subjected to a solvent dewaxing treatment during which e.g. a toluene/methyl ethyl ketone solvent mixture is added to a wax-containing oil, followed by removing wax (e.g. by means of filtration). The present process is particularly suitable, however, for separating a fluid feed mixture which has been obtained by subjecting a hydrocarbon oil to an extraction treatment with an organic solvent, in particular furfural. The solvents are usually recovered from the hydrocarbon oil-containing feed mixture in a conventional flashing process with high energy consumption. With the process according to the present invention it is possible to reduce said energy consumption considerably by recovering a major portion of the solvent from the feed side of the membrane and separating only a minor portion of the solvent (which has permeated through the membrane) e.g. less than about 10% w of the solvent in the feed from the hydrocarbon oil permeate by conventional means (e.g. stripping or (flash) distillation).

Preferably, the organic solvent:hydrocarbon oil weight ratio in the permeate is such that demixing occurs (due to the limited solubility of the hydrocarbon oil in the solvent and as a result of the low permeation rate of solvent through the applied membranes). A de-mixed permeate containing major hydrocarbon oil fraction and a minor organic solvent fraction can then suitably be recovered from the "other" (permeate) side of the membrane and said fractions can subsequently be separated; the organic solvent fraction may be recycled (suitably together with solvent in the retentate stream, i.e. retained at the "one" side of the membrane) to a solvent extraction unit or solvent dewaxing unit.

The hydrocarbon oil present in the fluid feed mixture which is to be separated preferably contains molecules having at least 10 carbon atoms, as present in particular in a lubricating base oil. Lubricating base oils are high molecular weight hydrocarbon mixtures containing compounds having a number of carbon atoms in the range from about $C_{20}$ to about $C_{50}$, and particularly from about $C_{25}$ to about $C_{45}$ typically either vacuum distillates or residua, and may contain minor quantities (less than about 5% w) of non-hydrocarbon such as sulfur and nitrogen compounds. However, other hydrocarbon oils such as gas oils, kerosenes or deasphalted oils can also be present in the fluid feed mixture.

The solvent:hydrocarbon oil weight ratio in the feed solution is suitably from 1:1–40:1, and preferably from 5:1–30:1.

The present separation process can be applied in single- or multi-step operation. In order to avoid, or at least reduce fouling and concentration polarization of the membranes, the feed solution is preferably passed along one side of a membrane with a sufficiently high velocity and may subsequently be passed along one side of at least one following membrane.

In order to prevent concentration polarization even better, part of the feed solution which has been passed along one side of a membrane is preferably recirculated by reintroducing said part into the feed solution to be passed along said side of the same membrane.

The invention further relates to hydrocarbon oils whenever obtained by a separation process as described hereinbefore.

Moreover, the invention relates to hydrocarbon oil-selective membranes whenever used in a process as described hereinbefore.

The following example illustrates the invention.

EXAMPLE

A liquid feed mixture containing 4% by weight of lubricating base oil in furfural is contacted at a pressure of 40 bar abs. and a temperature of 35° C. with the free side of a non-porous poly dimethyl siloxane membrane layer supported by a porous polypropylene layer having slit-shaped pores of 0.2×0.02 μm. A permeate is obtained which is demixed and of which the hydrocarbon oil fraction contains 6% by weight of furfural.

We claim:

1. Process for separating a fluid feed mixture containing a hydrocarbon lubricating base oil and an organic solvent selected from furfural and mixtures of toluene and methyl ethyl ketone which process comprises subjecting said fluid feed mixture to reverse osmosis in a reverse osmosis zone with a membrane comprising a layer of a silicone polymer comprising units according to the general formula:

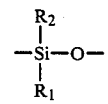

wherein $R_1$ and $R_2$ represent moieties independently chosen from the group consisting of hydrogen, alkyl, aryl, and aralkyl moieties, to afford: (1) a retentate stream having an organic solvent content higher than said feed mixture, and (2) a permeate stream having an organic solvent content less than the amount of solvent in said feed mixture, and recovering hydrocarbon oil from said permeate stream.

2. Process as in claim 1, wherein the silicone polymer is a polydimethylsiloxane.

3. Process as in claim 1, wherein when subjecting said feed to reverse osmosis the pressure differential across the reverse osmosis membrane is in the range from about 10 to 80 bar.

4. Process as in claim 1, wherein the fluid feed mixture is a mixture of a lubricating base oil and furfural.

5. Process as in claim 1, wherein the hydrocarbon oil in said fluid feed mixture is a petroleum originated hydrocarbon oil having at least 10 carbon atoms per molecule.

6. Process as in claim 1, wherein the feed mixture the solvent to hydrocarbon oil weight ration is in the range from 1:1 to 40:1.

7. Process as in claim 1, wherein solvent in the permeate stream is subsequently recovered from said permeate stream by stripping or flash distillation.

* * * * *